Patented Dec. 15, 1931

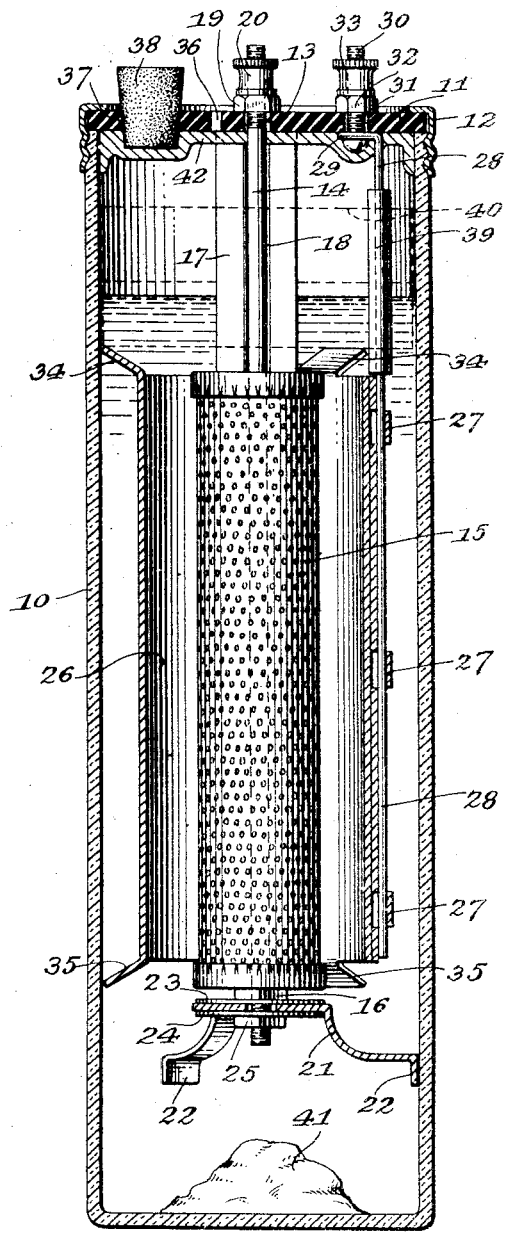

1,836,720

UNITED STATES PATENT OFFICE

MARTIN L. MARTUS, OF WOODBURY, AND EDMUND H. BECKER AND JAMES G. ROSS, OF WATERBURY, CONNECTICUT

PRIMARY BATTERY

Application filed August 26, 1925. Serial No. 52,490.

The present invention relates to an improved primary battery and method of producing the same, and has for an object to provide a battery unit of this character adapted particularly for radio or filament lighting, and especially to provide, as one important feature of the invention, a battery adapted to be sealed air-tight prior to being placed in use, and further to provide improved sealing means adapted to function during use of the battery as an air seal to protect the active parts of the battery and prevent evaporation and capillary creepage of the electrolyte to the outside of the receptacle. To this end it is proposed to provide an internal seal of paraffin or the like sealing the cover to the receptacle at the interior in such manner that upon addition of electrolyte the sealing material melts and forms a sealing layer upon the electrolyte.

It is also proposed to provide electrolyte material in the form of a solid cake of caustic soda, or the like, sealed within the receptacle, and which being very deliquescent is protected from deterioration by the seal, a further object being to provide a battery of this character adapted to be prepared for functioning merely by the addition of water, the heat of the solution formed by addition of water to the soda being sufficient to melt the paraffin seal.

Another object is to provide a battery having vent means adapted to be opened by removal of the seal.

A still further object is to provide for the placing of a layer or film of oil upon the surface of the solution, and without the danger of coating the battery elements with oil, which in the use of the battery retards the chemical action and renders the elements themselves non-conductive. It is proposed in the present invention to provide oil in the battery before actual use of the same and addition of liquid electrolyte, without the necessity of providing a container therefor, and to this end the invention consists in providing a quantity of oil in semi-liquid state as petroleum jelly, vaseline, or the like, so that it will remain fixed within the receptacle prior to use, and upon addition of electrolyte will dissolve, rising to the top of the electrolyte as a sealing layer or film.

With the above and other objects in view, an embodiment of the invention is shown in the accompanying drawing, and this embodiment will be hereinafter more fully described with reference thereto, and the invention will be finally pointed out in the claims.

The single figure of the drawing illustrates a battery in vertical section, embodying one form of the invention.

Referring to the drawing, the battery unit, according to the present embodiment of the invention, comprises a cylindrical glass receptacle 10, having a cover plate 11 of hard rubber, or the like secured thereon by a flanged screw ring 12, and provided with a central aperture 13 in which there is engaged the upper threaded end of a central hanger rod 14, upon which a cylindrical perforated basket 15 is supported by a nut 16 screwed upon its lower threaded end. A spacer web member 17 having a central longitudinal semi-circular cross-section groove 18 therein is soldered to the rod between the basket and the cover and the rod is secured to the cover by a nut 19 screwed upon its upper projecting end, a binding nut 20 being also screwed upon said end.

The basket 15 contains a suitable negative electrode substance, as copper oxide scale, and forms the negative electrode element of the battery.

Upon the lower end of the rod 14 there is provided a centrally perforated spider 21 including downwardly and outwardly bent spring arms, flanged at their ends, as at 22, to yieldably engage the inner wall of the receptacle, and secured upon the rod between insulation washers 23 and 24 by a retaining nut 25.

The positive element 26, of sheet zinc, is bent into cylindrical form with its edges overlapped, the overlying edge portion being provided in inwardly spaced relation to the edge with vertically aligned outwardly pressed loop portions 27, in which is engaged a vertical hanger and conductor wire 28 extending the length of the element and extending upwardly to the cover where it is provided with a bent loop 29 secured by a headed screw 30 engaged upwardly through an aperture 31 in the cover, and having a nut 32 engaged thereon at the upper side of the cover. A binding nut 33 is also engaged upon the screw 30.

The zinc element is further provided at its upper and lower edges with spaced outwardly bent integral lugs 34 and 35 adapted to engage the inner wall of the receptacle to center the element, the engagement being yieldable to provide a snug firm fit, inasmuch as the overlapped edges of the element are unattached and permit of slight contraction and expansion of the cylinder through the inherent resiliency of the metal.

The cover is further provided with a vent opening 36 and an aperture 37 having a removable stopper 38 of rubber or the like inserted therein, which normally seals the receptacle substantially air-tight and can be conveniently removed for the purpose of placing water in the receptacle, as will hereinafter more fully appear.

A rubber tube 39 is placed upon the wire 28 above the zinc electrode, for the purpose of protecting it from the solid cake of electrolute material placed in the receptacle preparatory to use of the battery, and as will presently more fully appear.

In order to enable the battery to be prepared for functioning merely by the addition of water, the same is provided with caustic soda, or the like, in cake form, the same being indicated by the dotted lines 40, and being supported above the electrode elements.

The oil placed in the battery preparatory to use is in the form of a semi-solid, or jelly-like paste, as petroleum jelly or vaseline, and is placed upon the bottom of the receptacle as at 41, out of contact with the electrode elements.

After the semi-solid oil and the caustic soda cake are placed in the battery the same is sealed interiorly by a layer of paraffin 42, or the like, covering the inner side of the cover and extending a short distance down the sides of the receptacle. The paraffin is applied by first melting the same within the closed receptacle, and inverting the same, whereupon it hardens upon the inner side of the cover, sealing the same at the edges and also sealing the vent opening 36 and the aperture 37. This provides an effective seal for the battery while it is stored or in shipment, and protects the soda cake, which is very deliquescent, from deterioration from the action of the atmosphere.

In order to start the battery to functioning the stopper is removed and the seal over the aperture 37 punched through, whereupon water is added up to the proper level, the soda dissolving and forming electrolyte solution, the heat produced by the solution being sufficient to melt the paraffin, which being lighter in specific gravity than the solution floats upon its upper surface, forming a seal which prevents creeping of the solution. The vent opening 36 is opened upon melting of the seal. As the electrolyte solution is formed the semi-solid oil 41 becomes liquefied, and being lighter in specific gravity than the solution flows to the top forming a sealing layer or film, as shown by the dotted lines.

It will be understood that the invention is adaptable to use with other types of primary and secondary battery units, in which case the solution and materials of the elements may be changed as is well known.

We have illustrated and described a preferred and satisfactory embodiment of the invention, but it will be obvious that changes may be made therein, within the spirit and scope thereof, as defined in the appended claims.

Having thus described our invention, what we claim and desire to secure by Letters Patent is:

1. In combination, a battery receptacle, a cover therefor having a filling opening, electrode elements within said receptacle, a solid electrolyte forming material within said receptacle, and sealing means at the inner side of said cover adapted to be opened through said opening in the cover to permit placing of water in the receptacle to form electrolyte with said solid material, said electrolyte adapted to melt said sealing means through generation of heat during the formation of said electrolyte.

2. In combination, a battery receptacle, a cover therefor having a filling opening, electrode elements within said receptacle, a solid electrolyte forming material within said receptacle, sealing means at the inner side of said cover adapted to be opened through said opening in the cover to permit placing of water in the receptacle to form electrolyte with said solid material, said electrolyte adapted to melt said sealing means through generation of heat, and oil within said receptacle in non-fluid state adapted upon addition of the electrolyte to become fluid.

3. In combination, a battery receptacle, a cover therefor having a filling opening, electrode elements within said receptacle, a solid electrolyte-forming material, and a solid sealing means at the inner side of said cover closing the opening and adapted to be melted by the heat produced by the formation of the electrolyte formed by the addition of water.

4. In combination, a battery receptacle, a cover therefor, electrode elements and soda within said receptacle, and a paraffin sealing layer at the inner side of said cover adapted to be melted by the heat produced by the formation of the electrolyte solution formed by the addition of water to the soda within the receptacle.

5. In combination, a battery receptacle, a cover therefor, electrode elements within said receptacle, and sealing means including paraffin at the inner side of said cover adapted to be liquefied and removed therefrom by heat produced by the formation of the electrolyte solution and to form a sealing layer upon said solution.

Signed at Waterbury, in the county of New Haven and State of Connecticut, this 20 day of Aug. A. D. 1925.

MARTIN L. MARTUS.
EDMUND H. BECKER.
JAMES G. ROSS.